United States Patent [19]
Adams et al.

[11] Patent Number: 6,059,520
[45] Date of Patent: May 9, 2000

[54] PROCESS OF LOADING ROLLS OF ROOFING MATERIAL ONTO A PALLET

[75] Inventors: Paul Stuart Adams, Saline, Mich.; Richard Franke Hayden, Medina, Ohio; Gerald M. Luken, Bakersfield, Calif.

[73] Assignee: Owens Corning Fiberglas Technology, Inc., Summit, Ill.

[21] Appl. No.: 09/092,097

[22] Filed: Jun. 5, 1998

[51] Int. Cl.[7] .................................................. B65G 49/07
[52] U.S. Cl. ........................... 414/800; 414/910; 414/911
[58] Field of Search ................................. 414/799, 745.1, 414/745.8, 910, 911, 800

[56] References Cited

U.S. PATENT DOCUMENTS

| | | |
|---|---|---|
| 523,609 | 7/1894 | Wadley . |
| 1,719,197 | 7/1929 | Schlothan . |
| 1,733,459 | 10/1929 | Hopper et al. . |
| 2,508,698 | 5/1950 | Von Beren . |
| 2,846,098 | 8/1958 | Kopp . |
| 3,436,895 | 4/1969 | Pearne et al. ........................ 414/745.8 |
| 3,627,147 | 12/1971 | Yowell et al. . |
| 4,124,127 | 11/1978 | Vevang . |
| 4,178,122 | 12/1979 | Abrahamson . |
| 4,610,592 | 9/1986 | Pienta ....................................... 414/799 |
| 4,874,078 | 10/1989 | Meyer . |
| 4,941,798 | 7/1990 | Meier ....................................... 414/911 |
| 5,332,351 | 7/1994 | Nelson et al. ........................... 414/911 |
| 5,341,911 | 8/1994 | Gamberini et al. . |
| 5,630,780 | 5/1997 | Crowley . |

*Primary Examiner*—Gregory A. Morse
*Attorney, Agent, or Firm*—Inger H. Eckert; James J. Dottavio

[57] ABSTRACT

An apparatus and process of loading rolls of roofing material onto a stationary pallet, wherein the process performs a series of operations. Each operation includes the steps of: (a) loading a roll of roofing material onto a table rotatably mounted on an upender, wherein the table is in a loading position such that the roll of roofing material rests on the table in a generally horizontal position; (b) rotating the table to a generally vertical position, thereby orienting the roll of roofing material to a generally vertical position; (c) moving the upender to an unloading position above the pallet; and (d) unloading the roll of roofing material from the table onto the pallet. The pallet is positioned stationary relative to the loading position of the table throughout the process.

17 Claims, 4 Drawing Sheets

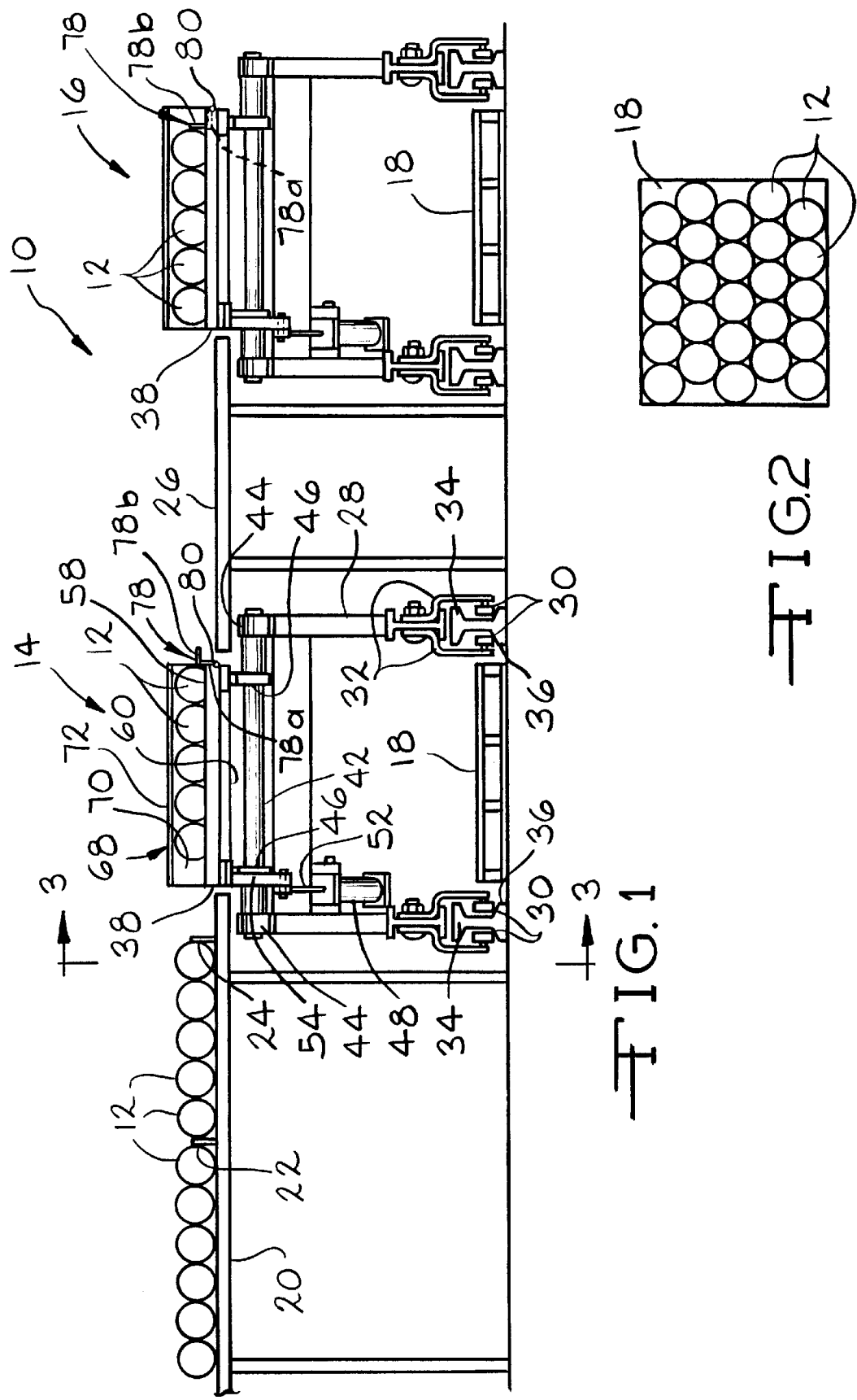

PROCESS OF LOADING ROLLS OF ROOFING MATERIAL ONTO A PALLET

TECHNICAL FIELD AND INDUSTRIAL APPLICABILITY OF THE INVENTION

This invention relates to a process of handling rolls of rolled roofing material and stacking the rolls onto a shipping pallet.

BACKGROUND OF THE INVENTION

Rolled roofing material is generally made of a glass fiber reinforced asphalt matrix with protective granules coated on one of the surfaces. The rolled roofing material is manufactured in long sheets which are then rolled up for ease of handling and transporting. The sheets of rolled roofing material are typically manufactured in 3 foot wide sheets and then rolled up by a roll-up machine to a diameter of about 9 inches. The rolls exit the roll-up machine on a conveyor and are typically oriented in a horizontal position. A plurality of rolls are then "palletized" or loaded onto a shipping pallet for storage and transportation. The rolls are placed vertically on the pallet such that they stand up on end. The plurality of rolls on the pallet are then often banded together for stability on the pallet.

In the past, the rolls of roofing material were palletized by workers manually lifting each roll from the conveyor and placing them on the pallet. However, the rolls of roofing material are relatively heavy and can weigh around 80 lbs. each. Therefore, the rolls of roofing material are cumbersome to manually handle. Manually lifting each roll is also labor intensive and time consuming. For these reasons, automated upender machines or "upenders" have been used to palletize the rolls of roofing material. Automated upenders typically include a platform or table for receiving a plurality of horizontally oriented rolls from the conveyor. For a conventionally sized pallet, four or five rolls in a linear arrangement can be loaded at a time onto the table. The rolls are loaded onto the table by automated actuator arms which push the rolls from the conveyor onto the table. After the rolls are loaded on the table, the table is pivoted to a first vertical position by a pneumatic or hydraulic cylinder. The rolls are supported by a bottom ledge extending from the table. A pair of movable side plates positioned adjacent the outermost rolls are moved by actuators so as sandwich the plurality of rolls. The side plates help prevent the rolls from moving or shifting when pivoted from the horizontal position to the first vertical position. Additional actuators then translationally move the table in a horizontal direction to a second vertical position above a pallet. The ledge is then retracted by actuators, thereby dropping the rolls onto the pallet. The table is then moved back to the conveyor to load another batch of rolls. The table is moved from the first vertical position to the second position by the same distance every time. Therefore, the pallet must be moved or indexed so that the next load of rolls is properly positioned on the pallet adjacent the previously load of rolls. To accomplish this task, the pallet is connected to an automated indexing machine which automatically re-positions the pallet after every load of rolls. Although the automated upender and the pallet indexing machine perform satisfactorily, the automated machines are very costly to manufacture and maintain. The automated upender and indexing machine can also occupy a large quantity of floor space.

It would therefore be desirable to have a system of palletizing rolls of roofing material onto a shipping pallet which is relatively inexpensive and easy to operate.

SUMMARY OF THE INVENTION

The above objects as well as other objects not specifically enumerated are achieved by a process of loading rolls of roofing material onto a stationary pallet, wherein the process performs a series of operations, in accordance with the present invention. Each operation includes the steps of: (a) loading a roll of roofing material onto a table rotatably mounted on an upender, wherein the table is in a loading position such that the roll of roofing material rests on the table in a generally horizontal position; (b) rotating the table to a generally vertical position, thereby orienting the roll of roofing material to a generally vertical position; (c) moving the upender to an unloading position above the pallet; and (d) unloading the roll of roofing material from the table onto the pallet. The pallet is positioned stationary relative to the loading position of the table throughout the process.

The process of loading rolls of roofing material onto a stationary pallet can be accomplished by the use of an upender, in accordance with the present invention. The upender includes a rail which extends between the stationary pallet and a supply conveyor having rolls of roofing material thereon. The upender further includes a frame which is movable along the length of the rail. A table is rotatably mounted on the frame and is movable between a generally vertical position and a generally horizontal position. The upender further includes a ledge which extends from the table. The ledge supports the rolls of roofing material when oriented in a generally vertical position. A support member extends from the table and is positioned above the roll of roofing material when the table is in the generally vertical position to prevent the roll of roofing material from tipping in a direction away from the table.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic front view of a first embodiment of an upender station having a pair of upenders for palletizing rolls of roofing material, in accordance with the present invention.

FIG. 2 is a top plan view of a pallet having rolls of roofing material stacked thereon in a nested arrangement.

DETAILED DESCRIPTION AND PREFERRED EMBODIMENTS OF THE INVENTION

Figure 3:
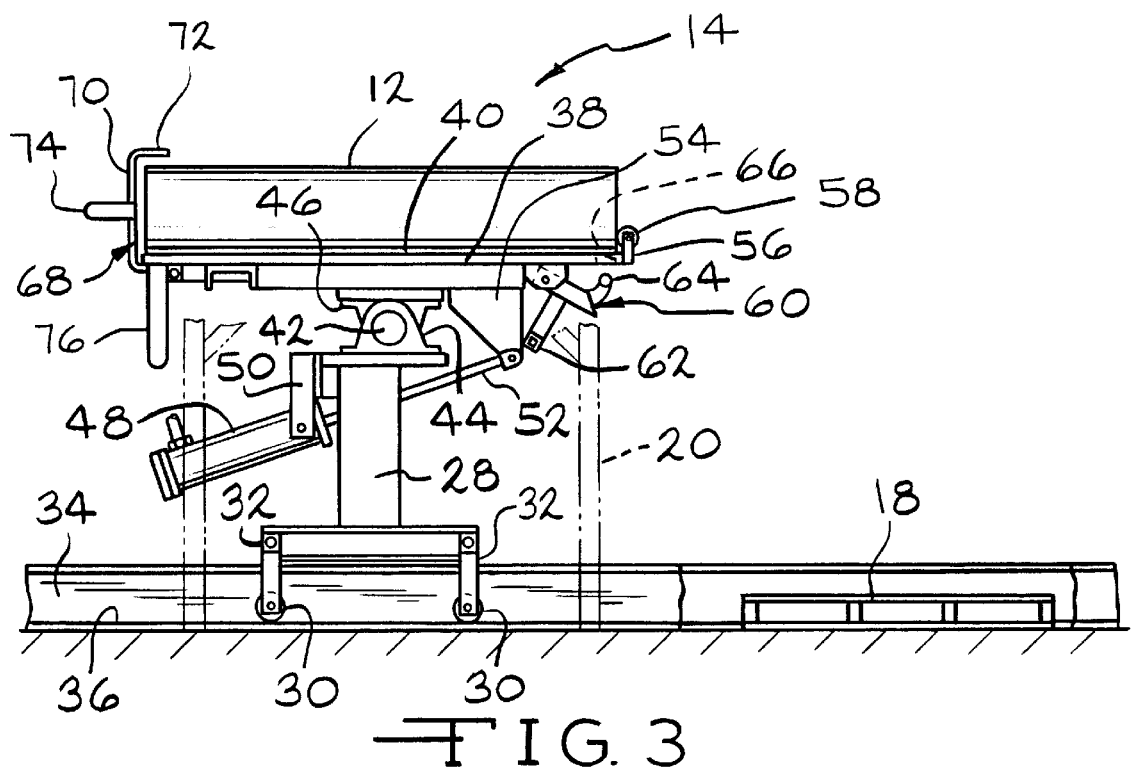
FIG. 3 is a schematic side view of one of the upenders taken along Lines 3—3 of FIG. 1, wherein the rolls of roofing material are loaded onto the table of the upender.

Referring now to the drawings, there is illustrated in FIG. 1, a first embodiment of an upender station, indicated generally at 10, for loading cylindrically shaped rolls of roofing material 12, in accordance with the present invention. The upender station 10 preferably includes first and second upenders, indicated generally at 14 and 16, respectively. As will be explained in detail below, each of the first and second upenders 14 and 16 load a plurality of rolls of roofing material 12 onto an associated stationary shipping pallet 18. The rolls of roofing material 12 are loaded on the pallet 18 such that the rolls of roofing material 12 stand on end in a generally vertical position, i.e., with the axis of the rolls of roofing material 12 oriented generally vertically. Preferably, the rolls of roofing material 12 are loaded on the pallet 18 in a nested arrangement, as shown in FIG. 2, to maximize the coverage area of the pallet.

The upender station 10 includes a supply conveyor 20 for supplying a stock of rolls of roofing material 12. The supply conveyor 20 includes a pair of movable gates 22 and 24 for releasing a select number of rolls of roofing material 12 from the supply conveyor 20, as will be explained in detail below. The upender station 10 further includes a bridge conveyor 26 extending between the first and second upenders 14 and 16 for loading the second upender 16. The supply conveyor 18 and the bridge conveyor 26 can be any suitable conveyor structure, such as a flat plate permitting the rolls of roofing material 12 to roll across.

The first and second upenders 14 and 16 are similar in function and structure and, therefore, only the first upender 14 will be described in detail. Common structures between the first and second upenders 14 and 16 will be described and designated with the same reference numbers. As best shown in FIGS. 1 and 3, the first upender 14 includes a frame 28 having two pairs of rollers 30 rotatably mounted thereon. The rollers 30 can be mounted on the frame 28 by any suitable manner, such as by brackets 32. The rollers 30 roll along the length of a pair of rails 34 which generally extend between the supply conveyor 20 and the associated pallet 18. The rollers 30 and the rails 34 cooperate to provide horizontal translational movement of the first upender 14 between the supply conveyor 20 and the pallet 18. The rails 34 have a sloped I-shaped cross-section, as shown in FIG. 1, and the rollers 30 ride on top of a bottom flange 36 of the rails 34. Of course, any suitable railing system may be used, such as for example, a linear bushing assembly.

Figure 4:
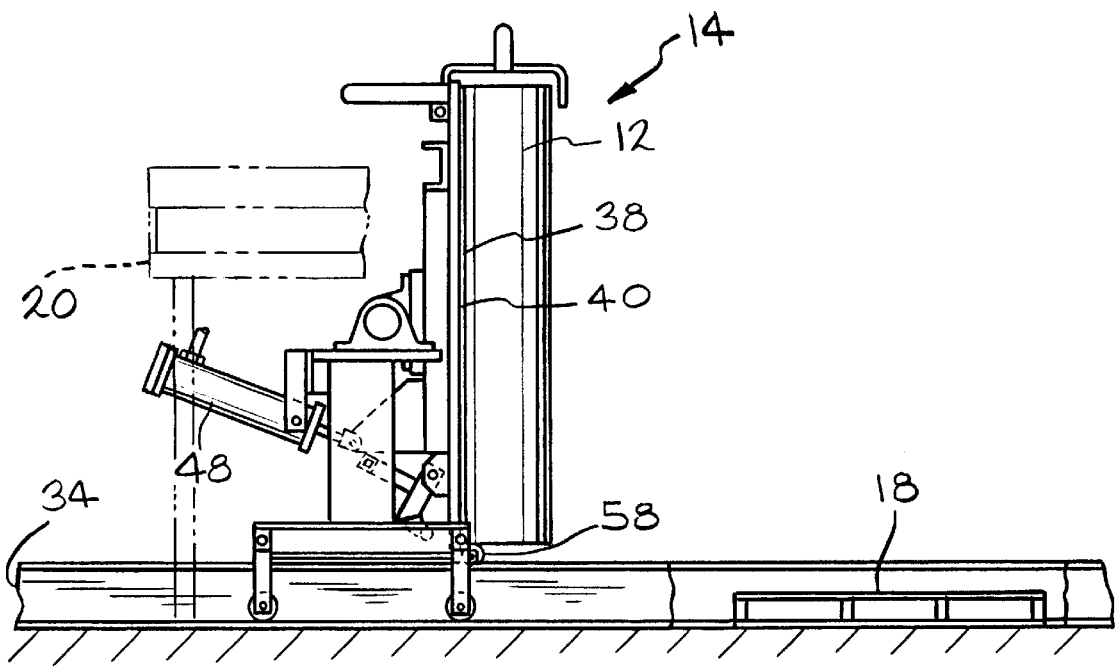
FIG. 4 is side view similar to FIG. 3, wherein the table and the rolls of roofing material have been rotated to a generally vertical position.

The first upender 14 further includes a table 38 having a generally flat surface 40 upon which the rolls of roofing material 12 rest when loaded onto the table 38. The table 38 is rotatably mounted on the frame 28 by a generally horizontal cylindrical shaft 42 which defines a pivot axis for the table 38. The shaft 42 is supported by a pair of bearing assemblies 44 mounted on the frame 28. A pair of couplings 46 are mounted on the table 38 and are attached to the shaft 42. The shaft 42, the bearing assemblies 44, and the couplings 46 cooperate to permit the table 38 to rotate relative to the frame 28. The table 38 is shown in the loading position in FIG. 3. The table 38 is rotatably movable between a generally horizontal position, as shown in FIG. 3, and a generally vertical position, as shown in FIG. 4. Preferably, the table 38 is rotated by an actuator 48, such as a pneumatic or hydraulic cylinder. The actuator 48 is pivotally mounted on a support flange 50 attached to the frame 28. The actuator 48 has an extendable arm 52 which is pivotally attached to a flange 54, which is attached to the table 38. The table 38 is rotated to the generally horizontal position by actuating the actuator 48 to extend the arm 52, as shown in FIG. 3. The table 38 is rotated to the generally vertical position by actuating the actuator 48 to retract the arm 52, as shown in FIG. 4. Preferably, the rotational pivot point of the table 38 defined by the shaft 42 is located close to the center of gravity of the table 38 with the rolls of roofing material 12 loaded thereon so that the force required to rotate the table 38 is minimized. If desired, the actuator 48 can be eliminated from the first and second upenders 14 and 16 so that the table 38 can be selectively rotated manually by a worker between the generally horizontal and vertical positions.

Figure 5:
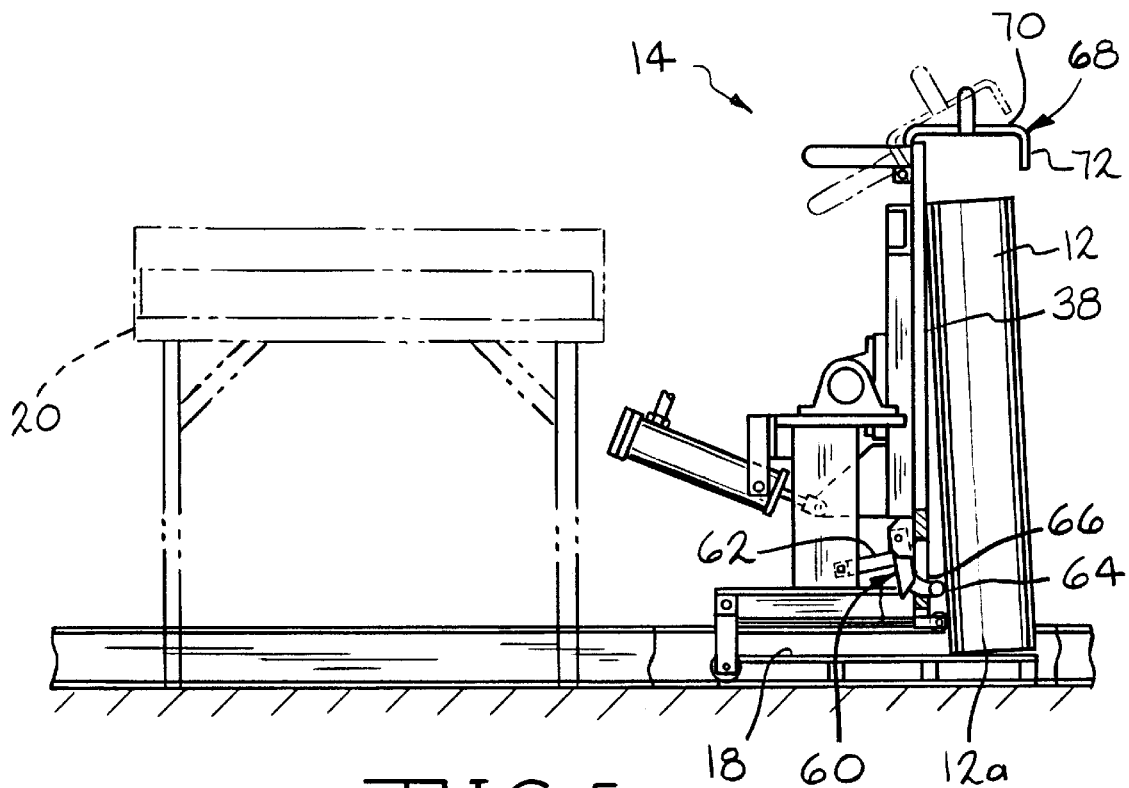
FIG. 5 is schematic side view similar to FIG. 3, wherein the table and the rolls of roofing material have been moved to an unloading position above the stationary pallet and are in position for unloading the rolls of roofing material.

The table 38 has a ledge 56 extending from an end thereof and supports the rolls of roofing material 12 when the table 38 is in the generally vertical position. Preferably, the ledge 56 includes a roller 58 to assist in removing the rolls of roofing material 12 at the appropriate time and position. The roller enables the rolls of roofing material 12 to roll off the ledge 56, thereby helping to prevent tearing of the bottom edge of the rolls of roofing material 12. To assist in manually unloading the rolls of roofing material 12 off the ledge 56 and onto the associated pallet 18, the first upender 14 preferably includes a lever mechanism, indicated generally at 60, as best shown in FIGS. 3 through 6. The lever mechanism 60 is pivotally attached to the table 38. The lever mechanism 60 includes a lever arm 62 and a pusher bar 64. The pusher bar 64 extends across the width of the table 38 and can be pivoted through an elongated slot 66 formed through the table 38, as best shown in FIG. 5.

Preferably, the table 38 includes a support member, indicated generally at 68, for preventing the rolls of roofing material 12 from tipping in a direction away from the table 38 when the rolls of roofing material 12 are in their generally vertical position, as will be explained in detail below. The support member 68 includes a plate 70 extending from an edge of the table 38 and positioned above the rolls of roofing material 12 when the rolls of roofing material 12 are in their generally vertical position. A lip 72 extends from an edge of the plate 70. The unattached end of the lip 72 is positioned so that if a roll of roofing material 12 were to tip in a clockwise direction, as viewing FIG. 4, the upper portion of the roll of roofing material 12 will catch on the lip 72, thereby preventing the roll of roofing material 12 from tipping completely over in a direction away from the table 38. Alternatively, the distance between the ledge 56 and the plate 70 can be just slightly larger than the length of the rolls of roofing material 12 so that the plate 70 would prevent the roll of roofing material 12 from tipping in an arcuate path, thereby eliminating the need for the lip 72. Preferably, the support member 68 is pivotally attached to the table 38 so that the support member 68 can be pivoted upwardly as needed, as shown in phantom lines in FIG. 5. For example, under certain circumstances a roll of roofing material 12 can unwind and "telescope" upwardly such that portions of the roll of the sheet material extend upward beyond the upper edges of the remaining roll of roofing material 12. In this case, the support member 68 can be pivoted upwardly to allow for clearance of the upper portion of the roll of roofing material 12.

As shown in FIG. 3, the table 38 further includes a pair of handle bars 74 and 76 attached to the support member 68 to provide a convenient hand gripping area for a worker to manually push or pull the first upender 14 along the rails 34. The handle bars 74 and 76 can have any suitable shape and orientation, and can be attached to any structure of the first upender 14.

As best shown in FIG. 1, the first upender 14 preferably includes an offset bar 78 pivotally attached to an edge of the table 38. The offset bar 78 has a generally L-shaped cross-section and is formed of a first stop plate 78a and a second stop plate 78b. The offset bar 78 is pivotally attached to the table by a hinge 80 connected to an edge of the first stop plate 78a. The offset bar 78 is movable to a first pivot position, as shown on the first upender 14 in FIG. 1, such that the first stop plate 78a extends vertically upward from the surface 80 of the table 38 and acts as a stop to place the rolls of roofing material 12 at a first loading position with respect to the table 38. The offset bar 78 is also movable to a second pivot position, as shown on the second upender 16 in FIG. 1, such that the second stop plate 78b extends vertically upward from the surface 40 of the table 38 and acts as a stop to place the rolls of roofing material 12 at a second loading position with respect to the table 38. By flipping the offset bar 78 between the first and second loading positions, the rolls of roofing material 12 can be oriented on the surface 40 of the table 38 in a shifted manner with respect to the other position. Thus, the plurality of rolls of roofing material 12 can be loaded onto the associated pallet 18 in a nested arrangement, as shown in FIG. 2.

To load the rolls of roofing material 12 onto the tables 38 of the first and second upenders 14 and 16, the gates 22 and 24 of the supply conveyor 20 are operated so that a desired number of rolls is placed between the gates 22 and 24. For the illustrated embodiment, five rolls of roofing material 12 are loaded across the width of the pallet 18, so that five rolls of roofing material 12 would be segregated between the gates 22 and 24. The gate 24 is then lowered so that the rolls of roofing material 12 can be directed across the first upender 14, across the bridge conveyor 26, and onto the table 38 of the second upender 16. The rolls of roofing material 12 are still oriented in a generally horizontal position, i.e., the axes of the rolls of roofing material 12 are oriented generally horizontally. The supply conveyor 20, the bridge conveyor 26, and/or the first and second upenders 14 and 16 can be slanted slightly downward to the right, as viewing FIG. 1, so that the rolls of roofing material 12 naturally roll forward. The gates 22 and 24 are then operated once more to place five rolls of roofing material 12 between the gates 22 and 24. The gate 24 is lowered so that the five rolls of roofing material 12 can be directed onto the table 38 of the first upender 14. By using multiple upenders, a larger number of rolls of roofing material 12 can be unloaded from the supply conveyor 20, thereby increasing productivity. Also, since a roll of roofing material 12 is typically manufactured at fixed intervals of time, the use of multiple upenders allows more time to load a pallet 18 before the supply conveyor becomes backed up. Of course, the upender station 10 can include just a single upender.

The operation of the first and second upenders 14 and 16 is substantially similar and, therefore, only the operation of the first upender 14 as illustrated in FIGS. 3 through 6 will be explained in detail. Once the rolls of roofing material 12 are loaded onto the table 38, as shown in FIG. 3, the table 38 is rotated by the actuator 48 to a generally vertical position, as shown in FIG. 4. The rolls of roofing material 12 are now resting on the roller 58 of the ledge 56 such that the rolls of roofing material 12 stand up on end in a generally vertical position. Of course, the rolls of roofing material 12 do not have to be oriented exactly vertically, but can be slanted, as shown, to rest against the surface 40 of the table 38.

The first upender 14 is moved along the rails 34 to an unloading position so that the rolls of roofing material 12 are at a desired position above the pallet 18. For example, for the first load of rolls of roofing material 12, the rolls are positioned towards the furthermost or forward end of the pallet 18. Preferably, the table 38 is rotated and the first upender 14 is moved concurrently. For example, a worker can actuate the actuator 48 and then manually push the first upender 14 forward towards the pallet 18 while the table 38 is being rotated from the generally horizontal position to the generally vertical position. Of course, the steps of rotating the table 38 and moving the first upender 14 can be performed sequentially, if so desired.

Once the first upender 14 is properly positioned at the desired unloading position, as shown in FIG. 5, the lever arm 62 of the lever mechanism 60 is depressed, thereby moving the pusher bar 64 forward or rightward in a counter clockwise direction, as viewing FIG. 5. Note that in FIG. 5, portions of the first upender 14 are broken away for clarity. Movement of the pusher bar 64 pushes a bottom portion 12a of the rolls of roofing material 12 beyond the roller 58 of the ledge 56, thereby dropping or unloading the roll of roofing material 12 onto the pallet 18, as shown in FIG. 5. The illustrated embodiment of the lever mechanism 60 is designed to be operated by depressing the lever arm 62 in a downward direction by a worker's foot. If desired, the lever mechanism 60 can be designed to operate as a hand actuator, and other suitable actuating mechanisms can be used.

Figure 6:
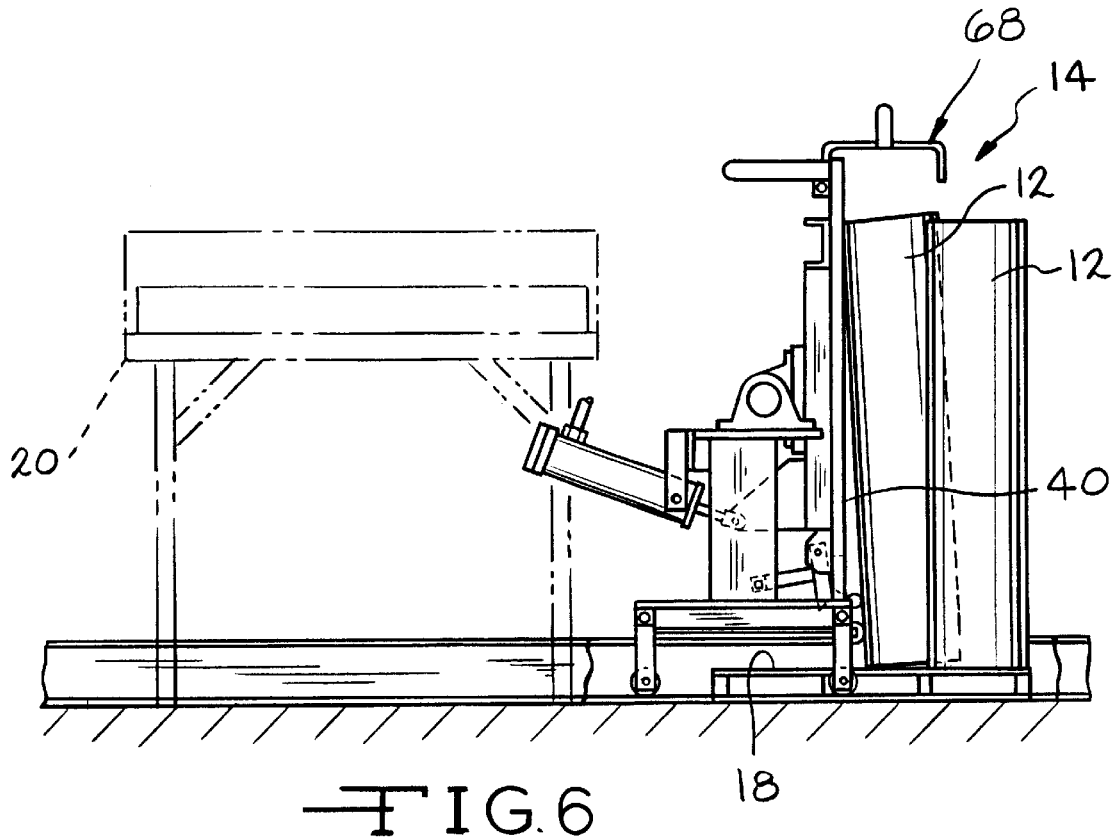
FIG. 6 is schematic side view similar to FIG. 3, wherein the upender is in position for unloading another row of rolls of roofing material onto the stationary pallet adjacent the previous row of rolls of roofing material in a nested arrangement.

After the first batch of rolls of roofing material 12 has been loaded onto the pallet 18, the first upender 14 can be moved back to its loading position, as illustrated in FIG. 3. The offset bar 78 is then moved to the other of the first or second positions to properly orient the rolls for a nesting arrangement. Another batch of rolls of roofing material is then loaded onto the first upender 14 as described above and the table 38 and the rolls 12 are rotated to a generally vertical position. The first upender 14 is moved to another unloading position, as illustrated in FIG. 6, so that the second batch of rolls of roofing material 12 can be unloaded on the pallet 18 adjacent the previous batch of rolls of roofing material 12 in a nested arrangement.

One of the aspects of the process of the invention is that the pallet 18 is stationary relative to the loading position of the table 38 during the entire loading of the pallet 18. The pallet 18 does not have to be indexed or moved during loading. Of course, a pallet lift (not shown) can be positioned under the pallet 18 during loading so that after the pallet is fully loaded with rolls of roofing material 12, the pallet 18 can be quickly rolled away from the upender station 10 for storage or shipment.

Figure 7:
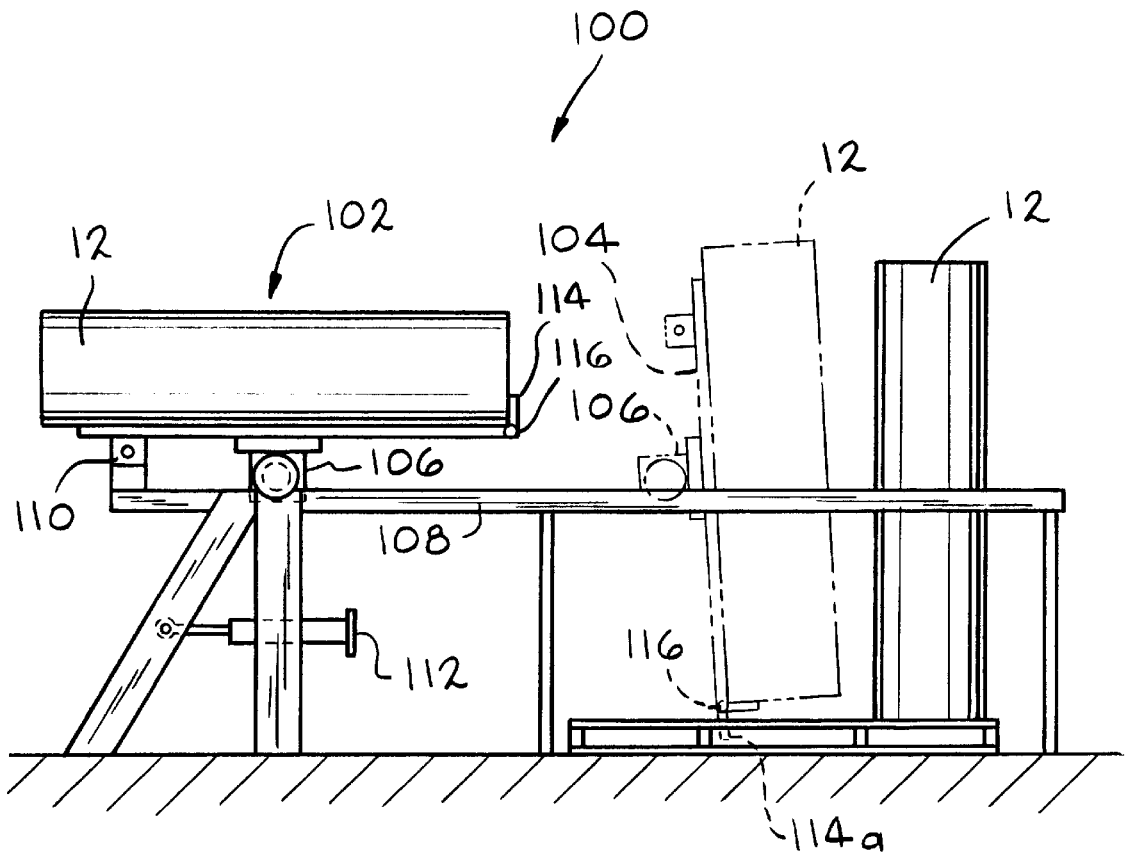
FIG. 7 is a schematic side view of a second embodiment of an upender, in accordance with the present invention.

Referring now to FIG. 7, there is illustrated a second embodiment of an upender station, indicated generally at 100, in accordance with the present invention. The upender station 100 includes an upender 102 having a table 104. A roller assembly 106 is attached to a table 104. The roller assembly 106 rides along rails 108 to move the upender 102 from a loading position, as illustrated in solid lines in FIG. 7, to an unloading position, as illustrated in phantom lines in FIG. 7. Preferably, the roller assembly 106 has a locking mechanism (not shown) so that the table 104 and the rolls of roofing material 12 are prevented from rotating beyond the generally vertical position. If a locking mechanism is not used, the rotational pivot point of the table is preferably located close to the center of gravity of the table 104 with the rolls of roofing material 12 loaded thereon so that the force required to rotate the table 104 is minimized.

The upender 102 further includes a latch assembly 110 for preventing the table 104 from prematurely rotating to the generally vertical position prior to loading of the rolls of roofing material 12 onto the table 104. Preferably, the rotational pivot point of the table 104 is slightly off center so that when the latch assembly 110 is released, the table 104 will naturally by gravitational force rotate in a clockwise direction, as viewing FIG. 7. A dashpot 112 is provided to cushion and decelerate the rotational movement of the table 104 as it rotates from the generally horizontal position to the generally vertical position. The upender 102 has a ledge 114 which is pivotally attached to the lower edge of the table 104 by a hinge 116. When the upender unloads the roll of roofing material 12 from the table 104 onto the pallet 18, the ledge 114 is pivoted in a clockwise direction, as shown by phantom lines 114a in FIG. 7, thereby dropping the rolls of roofing material onto the pallet 18. The ledge 114 can be shaped so as to fit in slots or openings formed in the pallet 18 when the ledge 114 is pivoted downward. Alternatively, the table 104 and the ledge 114 can be positioned above the pallet 18 by a required height to allow for clearance for the ledge 114. The upender 102 can also incorporate the various structural features of the first and second upender 14 and 16 of FIGS. 1 through 6 as described above, such as support member 68, the roller 66 on the ledge 64, and the lever mechanism 60.

The principle and mode of operation of this invention have been described in its preferred embodiments. However, it should be noted that this invention may be practiced otherwise than as specifically illustrated and described without departing from its scope.

What is claimed is:

1. A process of loading rolls of roofing material on a stationary pallet, the process comprising the steps of:
   (a) loading a plurality of rolls of roofing material onto a table rotatably mounted on an upender, the table being in a loading position such that the rolls of roofing material rest on the table in a generally horizontal position such that the rolls are in a juxtaposed relationship;
   (b) rotating the table to a generally vertical position, thereby orienting the rolls of roofing material to a generally vertical position, wherein the rolls remain in a juxtaposed relationship;
   (c) horizontally moving the upender to an unloading position above the pallet; and
   (d) unloading the plurality of rolls of roofing material from the table onto the pallet, wherein the pallet is positioned stationary relative to the loading position of the table.

2. The process of claim 1, wherein upper portions of the rolls of roofing material are restrained during steps (b) and (c), thereby preventing the roll of roofing material from tipping in a direction away from the table.

3. The process of claim 1, wherein the roll of roofing material is unloaded in step (d) by pushing a bottom portion of the roll of roofing material beyond a ledge mounted on the table for supporting the roll of roofing material in the vertical position.

4. The process of claim 1, wherein the roll of roofing material is unloaded in step (d) by rotating a lever mechanism pivotally mounted on the table, wherein rotation causes the lever mechanism to push a bottom portion of the roll of roofing material beyond the ledge.

5. An apparatus for loading rolls of roofing onto a stationary pallet, the apparatus comprising:
   a rail extending between the stationary pallet and a supply conveyor for supplying rolls of roofing material thereon;
   a frame movable along the length of the rail;
   a table rotatably mounted on the frame and movable between a generally vertical position and a generally horizontal position;
   a ledge extending from the table for supporting rolls of roofing material when oriented in a generally vertical position; and
   a support member extending from the table and positioned above the table when the table is in the generally vertical position to prevent rolls of roofing material from tipping in a direction away from the table.

6. The apparatus of claim 5, wherein the support member includes a plate positioned adjacent an upper end of the table, the plate defining a plane which is generally perpendicular to a plane defined by the table.

7. The apparatus of claim 6, wherein the support member includes a lip extending from the plate in a direction generally parallel to the table.

8. The apparatus of claim 5, wherein the table is rotatably mounted on the frame substantially about the center of gravity of the table with the rolls of roofing material resting thereon.

9. The apparatus of claim 5, wherein the ledge has a roller rotatably mounted thereon.

10. The apparatus of claim 5 further including a lever mechanism pivotally mounted on the table, the lever mechanism having a pusher bar movable to a position extending through a slot formed in the table to push a bottom portion of rolls of roofing material past the ledge.

11. The apparatus of claim 5 further including an offset bar pivotally attached to the table for positioning rolls of roofing material at first and second positions with respect to the table, the offset bar having first and second stop members, and the offset bar being movable between a first pivot position and a second pivot position, wherein the first stop member places the roll of roofing material at the first position, and a second pivot position such that the second stop member places the roll of roofing material at the second position.

12. The apparatus of claim 11, wherein the first and second stop members are generally flat plates connected together and extending generally perpendicular to each other.

13. A process of loading rolls of roofing material on a stationary pallet wherein the process performs a series of operations, each operation comprising the steps of:
   (a) loading a roll of roofing material onto a table rotatably mounted on an upender, the table being in a loading position such that the roll of roofing material rests on the table in a generally horizontal position, wherein the upper portions of the rolls of roofing material are restrained by a support member mounted on the table and positioned adjacent the upper portion opposite the table;
   (b) rotating the table to a generally vertical position, thereby orienting the roll of roofing material to a generally vertical position;
   (c) horizontally moving the upender to an unloading position above the pallet; and
   (d) unloading the roll of roofing material from the table onto the pallet, wherein the pallet is positioned stationary relative to the loading position of the table throughout the process.

14. A process of loading rolls of roofing material on a stationary pallet wherein the process performs a series of operations, each operation comprising the steps of:
   (a) loading a first roll of roofing material onto a first table rotatably mounted on a first upender and a second roll of roofing material onto a second table rotatably mounted on a second upender, the first upender and the second upender being used to load the rolls of roofing material onto respective first and second pallets, and wherein the loading of rolls of roofing material onto the second upender includes rolling the second roll of roofing material across the first table and a bridge conveyor extending between the first table and the second table, the second table being in a loading position such that the second roll of roofing material rests on the second table in a generally horizontal position;

(b) rotating the second table to a generally vertical position, thereby orienting the second roll of roofing material to a generally vertical position;

(c) horizontally moving the second upender to an unloading position above the second pallet; and (d) unloading the second roll of roofing material from the second table onto the second pallet, wherein the second pallet is positioned stationary relative to the loading position of the second table throughout the process.

15. A process of loading rolls of roofing material on a stationary pallet wherein the process performs a series of operations, each operation comprising the steps of:

(a) loading a roll of roofing material onto a table rotatably mounted on an upender, the table being in a loading position such that the roll of roofing material rests on the table in a generally horizontal position;

(b) rotating the table to a generally vertical position, thereby orienting the roll of roofing material to a generally vertical position;

(c) horizontally moving the upender to an unloading position above the pallet; and (d) unloading the roll of roofing material from the table onto the pallet by pushing a bottom portion of the roll of roofing material beyond a ledge mounted on the table for supporting the roll of roofing material in the vertical position and pushing the bottom portion of the roll of roofing material along a roller rotatably mounted on the ledge, wherein the pallet is positioned stationary relative to the loading position of the table throughout the process.

16. The process of claim 1 further comprising the steps of:

(a) after the plurality of rolls is unloaded, loading a second plurality of rolls of roofing material onto the table, the table being in a loading position such that the second plurality of rolls of roofing material are in a juxtaposed relationship and rest on the table in a generally horizontal position;

(b) rotating the table to a generally vertical position, thereby orienting the second plurality of rolls of roofing material to a generally vertical position, wherein the rolls remain in a juxtaposed relationship;

(c) horizontally moving the upender to an unloading position above the pallet; and (d) unloading the second plurality of rolls of roofing material from the table onto the pallet, wherein the pallet is positioned stationary relative to the loading position of the table throughout the process.

17. The process of claim 16, wherein the second plurality of rolls are positioned in a nested arrangement with the first plurality of rolls.

* * * * *